US006625477B1

(12) United States Patent
Wakefield

(10) Patent No.: US 6,625,477 B1
(45) Date of Patent: Sep. 23, 2003

(54) APPARATUS AND METHOD FOR IDENTIFYING AND CHARGING BATTERIES OF DIFFERENT TYPES

(75) Inventor: Ivan Nelson Wakefield, Cary, NC (US)

(73) Assignee: Ericsson Inc., Research Triangle Park, NC (US)

( * ) Notice: Subject to any disclaimer, the term of this patent is extended or adjusted under 35 U.S.C. 154(b) by 0 days.

(21) Appl. No.: 08/668,647

(22) Filed: Jun. 12, 1996

(51) Int. Cl.⁷ .............................................. H01M 10/46
(52) U.S. Cl. ...................... 455/572; 455/573; 455/574; 323/223; 323/225; 320/31
(58) Field of Search ........................... 455/89, 127, 90, 455/95, 572–574; 323/223, 225, 268, 274, 275, 325, 339; 320/31, 13, 35, 21, 29

(56) References Cited

U.S. PATENT DOCUMENTS

| 4,006,396 A | | 2/1977 | Bogut ............................ 320/2 |
| 4,061,956 A | | 12/1977 | Brown et al. ................... 320/22 |
| 4,628,243 A | | 12/1986 | Hodgman et al. ............. 320/22 |
| 4,965,507 A | | 10/1990 | Smilanovich et al. ......... 320/48 |
| 4,965,738 A | | 10/1990 | Bauer et al. .................. 364/483 |
| 5,237,257 A | * | 8/1993 | JohnsTon et al. ............... 320/2 |
| 5,355,073 A | | 10/1994 | Nguyen ......................... 320/15 |
| 5,411,816 A | | 5/1995 | Patino ............................ 429/7 |
| 5,565,756 A | * | 10/1996 | Urbish et al. .................. 320/15 |
| 5,608,306 A | * | 3/1997 | Rybeck et al. ................. 320/15 |
| 5,656,917 A | * | 8/1997 | Theobald ....................... 320/22 |
| 5,705,915 A | * | 1/1998 | Douglas et al. ................. 320/5 |

FOREIGN PATENT DOCUMENTS

| GB | 1 564 691 | 4/1980 |
| JP | 4096629 | 3/1992 |
| WO | 9010334 | 9/1990 |

* cited by examiner

Primary Examiner—Andy Rao
(74) Attorney, Agent, or Firm—Coats & Bennett, P.L.L.C.

(57) ABSTRACT

An apparatus for identifying batteries of different types is disclosed where each battery includes a positive terminal, a negative terminal, and an identification terminal connected to a tap between two cells of the battery. The apparatus includes a positive contact positioned so as to engage the positive terminal of a battery, a negative contact positioned so as to engage the negative terminal of the battery, an identification contact positioned so as to receive a tap voltage from the identification terminal of the battery indicative of a particular battery type, and a microcomputer connected to the positive, negative, and identification contacts, wherein the microcomputer identifies the particular type of the battery on the basis of where the tap voltage lies with respect to a plurality of specified voltage ranges. The apparatus may also include a circuit connected to the microcomputer, the positive contact, the negative contact, and the identification contact for supplying a charging current to the battery in accordance with a specified charging algorithm applicable to the particular battery type.

26 Claims, 3 Drawing Sheets

APPARATUS AND METHOD FOR IDENTIFYING AND CHARGING BATTERIES OF DIFFERENT TYPES

BACKGROUND OF THE INVENTION

1. Field of the Invention

The present invention relates generally to the charging of batteries and, in particular, to an apparatus and method for identifying batteries of different types and adapting the manner in which such batteries are charged in accordance therewith.

2. Description of Related Art

The use of rechargeable batteries to power electronic devices is well known and desirable in order to minimize cost and maximize use of resources. For example, such batteries have been utilized extensively with handheld mobile telephones and other radio communication equipment among other items. In an effort to maximize the length of time a battery is able to provide adequate power between chargings, several different types of rechargeable batteries have been and are continuing to be developed. This includes batteries made of different materials, such as nickel cadmium, nickel metal hydride, and lithium. Because each type of rechargeable battery has an optimum manner in which it should be charged, it is desirable for a charger to be tailored for each one instead of providing current in the same manner. This requires the charging apparatus to be able to identify the type of battery and provide the charging current in a manner preferred for such battery type.

Several chargers exist for providing charge to batteries of different sizes, shapes, and capacities (e.g., U.S. Pat. No. 5,365,159 to Chen, U.S. Pat. No. 5,357,185 to Chen, U.S. Pat. No. 5,280,229 to Faude et al., U.S. Pat. No. 5,245,266 to Yuen, U.S. Pat. No. 5,157,318 to Wang, U.S. Pat. No. 5,148,094 to Parks et al., U.S. Pat. No. 4,963,812 to Mischenko et al., and U.S. Pat. No. 4,816,735 to Cook et al.). While these chargers appear to be useful for their intended purpose, they do not have the ability to distinguish between batteries of substantially the same size and shape which are made of different materials.

In order to accomplish this task, other charging apparatuses have been disclosed that identify different types of batteries by means of sensing circuits therein which receive certain information from the battery. Examples of this kind of charger are described in U.S. Pat. No. 5,350,993 to Toya et al., U.S. Pat. No. 5,200,686 to Lee, U.S. Pat. No. 5,184,059 to Patino et al., and Japanese Patent 402237439 to Kudo. These chargers tend to overcomplicate the process and therefore increase cost for both the charger and the associated battery.

Although the description of related art has focused on battery chargers and the manner in which they identify batteries of different types, it should be recognized that this is only one area in which battery identification is desirable. Other components (and their functions) in electronic devices oftentimes rely upon or affect the electrical characteristics of a particular battery type, such as circuitry in communication devices relating to transmitter power level and length of transmission. Accordingly, the present invention is concerned with identification of battery types in general, as well as with battery charging devices specifically. In this regard, U.S. Pat. No 5,355,073 to Nguyen and U.S. Pat. No. 4,061,956 to Brown et al. both disclose the broad approach of inserting a tap between cells of a battery for the purpose of monitoring battery voltage as an aid to charging. Neither of these two references, however, specifically recites the use of placing these taps at different points on their batteries for identification purposes.

In light of the foregoing, a primary objective of the present invention is to provide an apparatus having the ability to identify different types of batteries.

Another object of the present invention is to provide an apparatus having the ability to charge different types of rechargeable batteries.

A further object of the present invention is to provide an apparatus having the ability to charge different types of rechargeable batteries according to charging algorithms particularly applicable thereto.

Yet another object of the present invention is to provide an apparatus having the ability to charge rechargeable batteries of different capacities.

Still another object of the present invention is to provide a handheld mobile telephone including an apparatus which is able to identify and charge different types of rechargeable batteries.

Another object of the present invention is to provide a handheld mobile telephone including an apparatus which automatically identifies the type of battery connected thereto.

A further object of the present invention is to provide a battery charger accessory having the ability to identify and charge different types of rechargeable batteries.

An object of the present invention is to provide an interface between a handheld mobile telephone and a battery pack which permits the use of different batteries.

Yet another object of the present invention is to provide an interface between a handheld mobile telephone and a battery pack which automatically identifies the type of battery therein so that it may be charged according to a particular charging algorithm applicable thereto.

Another object of the present invention is to provide a method of identifying the type of battery to be charged and adapting the manner in which the battery is charged in response thereto.

These objects and other features of the present invention will become more readily apparent upon reference to the following description when taken in conjunction with following drawing.

SUMMARY OF THE INVENTION

In accordance with one aspect of the present invention, an apparatus for identifying batteries of different types is disclosed. Each battery includes a positive terminal, a negative terminal, and an identification terminal connected to a tap between two cells of the battery. The apparatus includes a positive contact positioned so as to engage the positive terminal of a battery, a negative contact positioned so as to engage the negative terminal of the battery, an identification contact positioned so as to receive a tap voltage from the identification terminal of the battery indicative of a particular battery type, and a microcomputer connected to the positive, negative, and identification contacts, wherein the microcomputer identifies the particular type of the battery on the basis of where the tap voltage lies with respect to a plurality of specified voltage ranges. The apparatus may also include a circuit connected to the microcomputer, the positive contact, the negative contact, and the identification contact for supplying a charging current to the battery in accordance with a specified charging algorithm applicable to the particular battery type.

In accordance with a second aspect of the present invention, a battery pack for a handheld mobile telephone is disclosed as including a housing, a battery having a plurality of cells positioned within the housing, and an interface for electrically coupling the battery to the handheld mobile telephone, wherein the type of battery positioned within the housing is distinguished by a tap voltage provided by the identification terminal. The battery interface further includes a positive terminal connected to the battery at a first end and a negative terminal connected to the battery at a second end, as well as an identification terminal connected to a tap between a pair of cells in the battery.

In a third aspect of the present invention, a handheld mobile telephone is disclosed as including a main housing, a signal processing circuit located within the main housing for operating the handheld mobile telephone in a particular mode of communication, a battery pack attached to the main housing for powering the handheld mobile telephone, an interface for electrically coupling the battery pack with the signal processing circuit, where the interface includes an identification contact for receiving a tap voltage from the battery pack indicative of a particular battery type, and circuitry associated with the signal processing circuit for identifying the particular type of battery pack from the tap voltage. The handheld mobile telephone may also include circuitry associated with the signal processing circuit for charging the battery pack in accordance with a particular charging algorithm applicable to the electrical characteristics of the battery pack.

In accordance with a fourth aspect of the present invention, a method of identifying different types of batteries is disclosed. The method includes the steps of positioning a tap between adjacent cells of each battery, connecting an identification terminal to the tap so that a tap voltage indicative of a particular battery type is provided thereto, electrically coupling the battery to a microcomputer by means of a positive terminal, a negative terminal, and the identification terminal, comparing the tap voltage to a plurality of specified voltage ranges stored in the microcomputer, and identifying the particular type of the battery from the specified voltage range within which the tap voltage lies. The method may also include the step of supplying a charging current to the battery in accordance with a charging algorithm in the microcomputer applicable to the particular battery type.

BRIEF DESCRIPTION OF THE DRAWING

While the specification concludes with claims particularly pointing out and distinctly claiming the present invention, it is believed the same will be better understood from the following description taken in conjunction with the accompanying drawing in which:

DETAILED DESCRIPTION OF THE INVENTION

Figure 1:
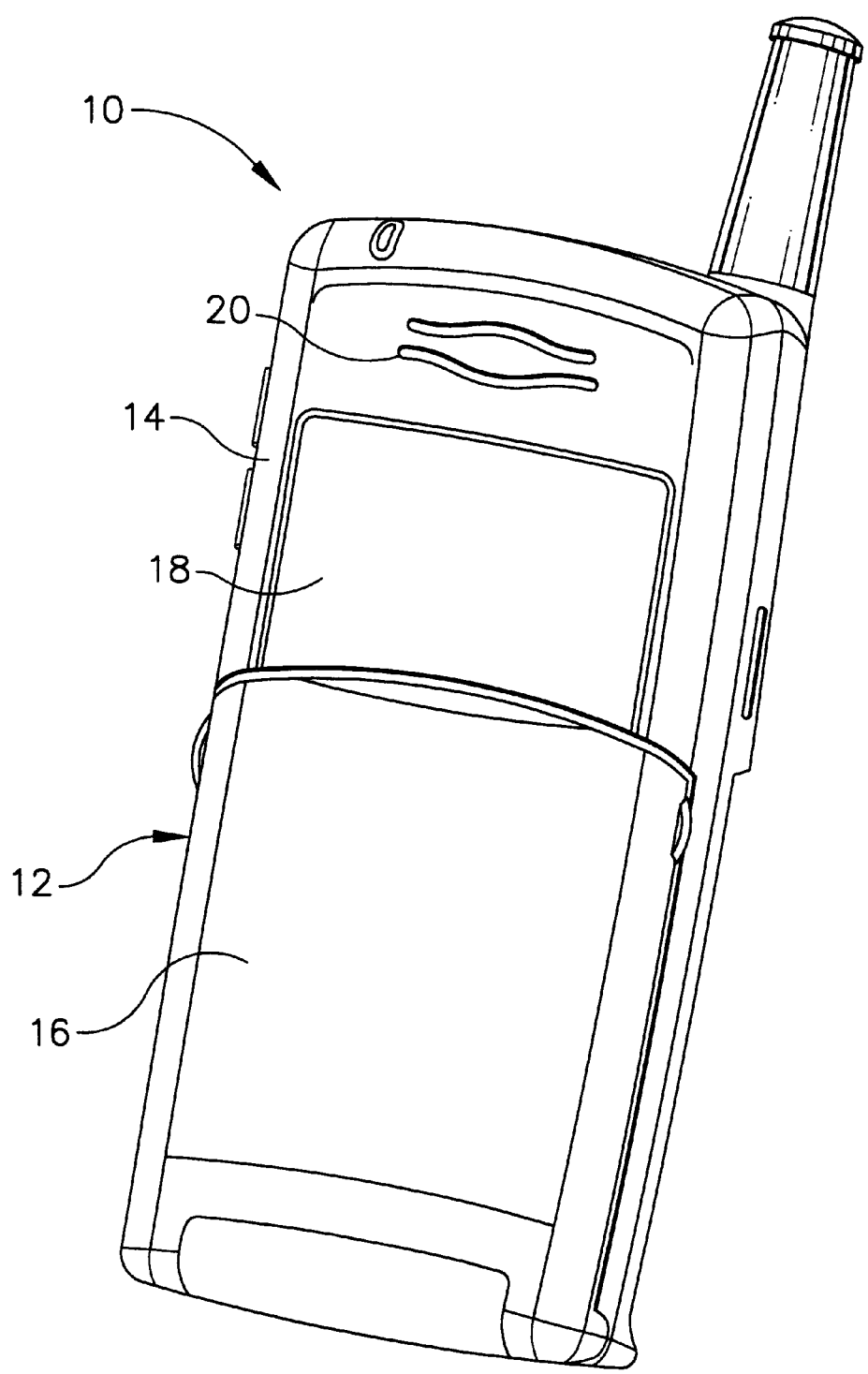
FIG. 1 is a front perspective view of a handheld mobile telephone including a battery identification and charging apparatus in accordance with the present invention.

Referring now to the drawing in detail, wherein identical numerals indicate the same elements throughout the figures, FIG. 1 depicts a handheld mobile telephone 10 including a battery charging apparatus and battery pack interface in accordance with the present invention. In particular, it will be seen that handheld mobile telephone 10 includes a main housing 12, in which a top surface 14 thereof offers access to a keypad (not shown) behind a cover 16, a display 18, and a speaker 20. While not shown, handheld mobile telephone 10 further includes signal processing circuitry within main housing 12 for operating it in a designated mode of communication.

Figure 2:
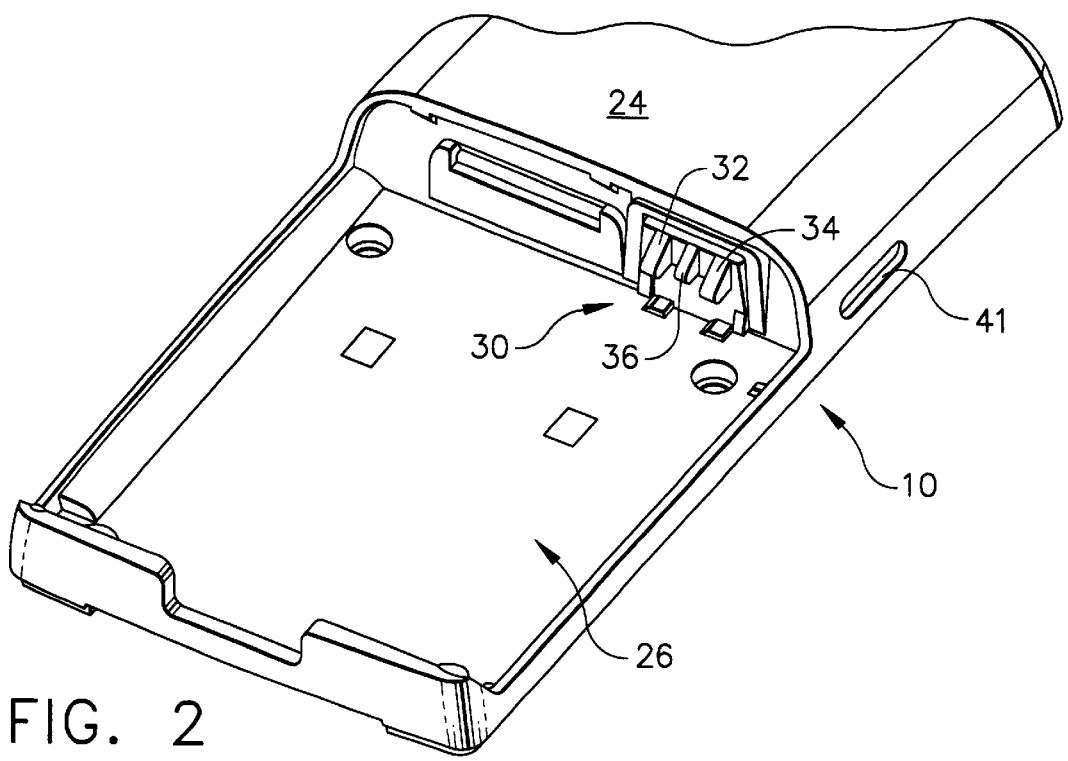
FIG. 2 is a partial rear perspective view of the handheld mobile telephone depicted in FIG. 1, where the battery pack has been removed for clarity.
Figure 3:
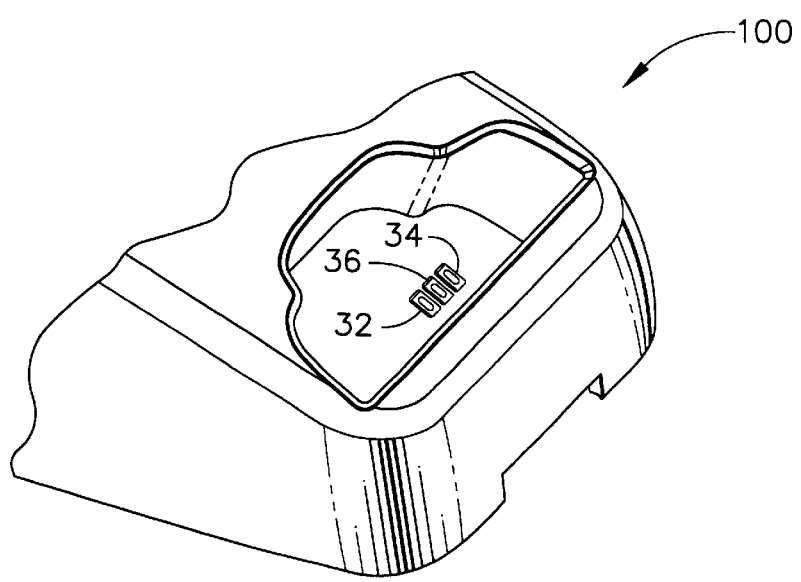
FIG. 3 is a partial perspective view of a battery charger accessory including the battery identification and charging apparatus in accordance with the present invention.

As best seen in FIG. 2, a rear surface 24 of main housing 12 has a cavity 26 in which a battery pack 28 of compatible shape and size may be positioned to power handheld mobile telephone 10. Battery pack 28 is not shown in FIG. 2 in order to see an interface 30 located in cavity 26 which is provided to electrically couple battery pack 28 with handheld mobile telephone 10. More specifically, interface 30 includes a first contact 32, a second contact 34, and a third contact 36. First contact 32 is preferably a positive contact positioned so as to engage a positive terminal of battery pack 28. Although not required, each battery pack 28A and 28B may have distinctly positioned positive terminals which necessitate separate first contacts 32A and 32B. It will be noted in FIG. 4 that such first contacts 32A and 32B would be connected in parallel in order to provide power to handheld mobile telephone 10.

Further, it will be noted that second contact 34 is preferably a negative contact positioned so as to engage a negative terminal of battery pack 28 since the negative terminals of battery packs 28A and 28B are preferably positioned in like locations. Accordingly, it will be seen in FIG. 4 that first contacts 32A and 32B will be utilized to receive power from battery packs 28A and 28B, respectively, while second contact 34 is utilized as ground (although the respective functions of these contacts may be reversed).

In accordance with the present invention, third contact 36 is utilized as an identification contact. Preferably, third contact 36 is positioned adjacent second contact 34 so as not to interfere with engagement of first contacts 32A and 32B (although third contact 36 may be positioned anywhere along interface 30).

It will be understood that different types of rechargeable batteries may be utilized in battery pack 28, including those made of nickel metal hydride as represented by battery pack 28A and lithium (e.g., liquid lithium ion and plastic lithium ion) as represented by battery pack 28B. While the nickel metal hydride and lithium battery types are rechargeable, each has a preferred manner of charging for optimum usage. Further, such batteries may be configured to have different voltage capacities. In the handheld mobile telephone environment, however, the batteries will generally provide a voltage in the range of approximately three to approximately four volts.

Figure 4:
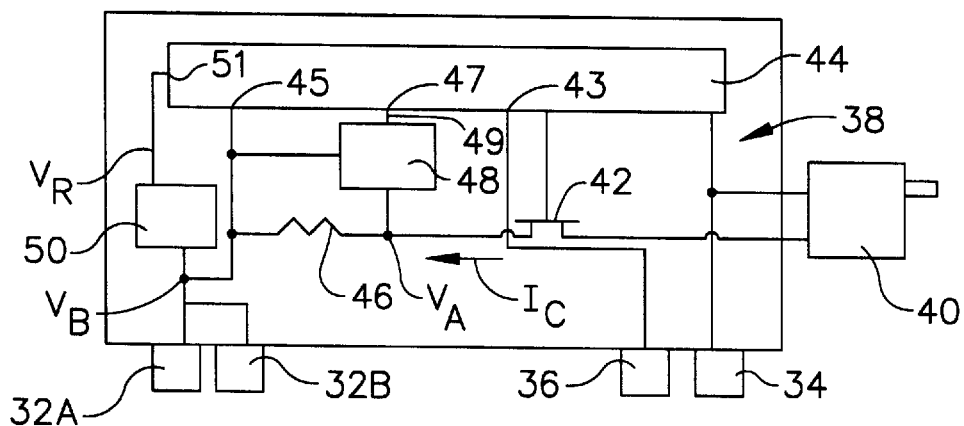
FIG. 4 is a schematic diagram depicting the battery identification and charging apparatus of the present invention which may be utilized in the handheld mobile telephone and battery charger accessory shown in FIGS. 1–3.

It is highly desirable that handheld mobile telephone 10 include circuitry, indicated generally by the numeral 38 in FIG. 4, which would enable battery pack 28 to be charged when positioned within cavity 26. In particular, charging circuitry 38 would preferably be associated with the signal processing circuit and provide current to battery pack 28 for charging in accordance with a specified charging algorithm applicable to the particular battery type therein and the electrical characteristics thereof. While charging circuitry 38 may provide a direct path between battery pack 28 and a current source 40 (e.g., an AC/DC adapter from an ordinary wall outlet connected to a complementary slot 41 in handheld mobile telephone 10), it is preferred that a switching device 42 (such as a field effect transistor) be positioned between current source 40 and the junction of first contacts 32A and 32B to better vary the charging process.

A microcomputer 44 or other similar printed circuit module in handheld mobile telephone 10 contains the various charging algorithms for the different battery types and is therefore responsible for the opening and closing of switching device 42 in this embodiment. Microcomputer 44 is also utilized to identify the particular battery type in battery pack 28, as described in greater detail below.

Figure 5A:
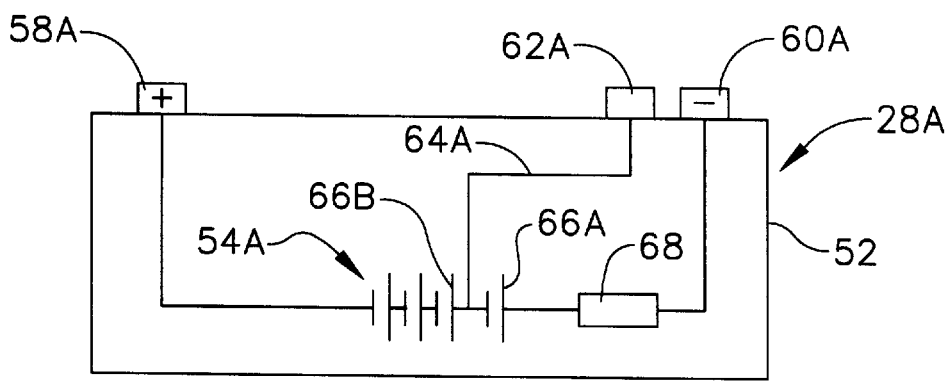
FIG. 5A is a schematic diagram of a battery pack receivable in the handheld mobile telephone of FIGS. 1–2 and the battery charger accessory of FIG. 3 including a first type of battery.
Figure 5B:
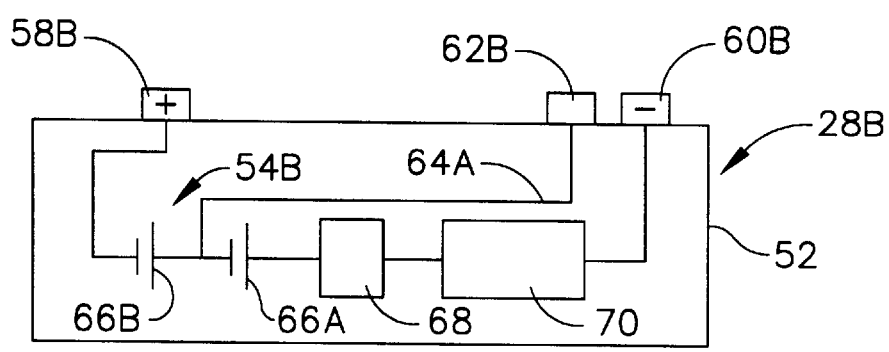
FIG. 5B is a schematic diagram of a battery pack receivable in the handheld mobile telephone of FIGS. 1–2 and the battery charger accessory of FIG. 3 including a second type of battery.

With respect to the present invention, it will be understood from FIGS. 4 and 5A–5B that charging circuit 38 reads a voltage $V_T$ received at third contact 36 to determine battery type. Voltage $V_T$ is provided to microcomputer 44 at an input 43 by a separate identification terminal 62 on battery pack 28 connected to a tap 64 in battery 54. It will be understood that battery 54 has a plurality of cells 66 and that tap 64 is positioned between two adjacent cells 66A and 66B. In this way, only a portion of the overall battery voltage is provided as tap voltage $V_T$. It is preferred that cells 66A and 66B be those adjacent negative terminal 60 so that tap 64 is consistently positioned with regard to each battery type. Accordingly, tap voltage $V_T$ provided by a four cell battery (e.g., nickel metal hydride type in FIG. 5A) is approximately one-fourth the overall battery voltage and a two cell battery (e.g., lithium type in FIG. 5B) is one-half the overall battery voltage. Of course, tap 64 may be positioned between any two adjacent cells 66 so long as it provides a tap voltage $V_T$ distinctive for each type of battery 54. In this way, microcomputer 44 is able to identify the particular battery type by determining which voltage range tap voltage $V_T$ resides so that the applicable charging algorithm is utilized therewith. The maximum number of batteries which may be identified is a function of the number of specified voltage ranges and the unique tap voltages $V_T$ available for each particular battery type. For example, tap voltage $V_T$ will be less than 2 volts for the nickel metal hydride battery and greater than 2 volts for the lithium battery.

For the rechargeable batteries of FIG. 5A and 5B, it will be understood that switching device 42 is modulated by charging circuitry 38 at a specified frequency to provide the level of charging current, indicated by arrow $I_c$, required for rapid charging or trickle charging as desired. Charging current $I_c$ is monitored by microcomputer 44 to verify that it is in accordance with the particular charging algorithm being utilized. This is accomplished by reading the voltage drop across a load 46 in the form of a resistor (preferably on the order of 0.10 Ohm). The voltage upstream of load 46 (i.e., between switching device 42 and load 46) is designated as $V_A$ and the voltage downstream of load 46 (i.e., between load 46 and the junction of first and second contacts 32A and 32B) is designated as voltage $V_B$. It will be noted that a differential amplifier 48 is preferably located within charging circuitry 38 and receives voltages $V_A$ and $V_B$ at the inputs thereof to add gain so that the difference therebetween (represented by an output 49 of differential amplifier 48) sent to input 47 of microcomputer 44 is at a level which permits monitoring of charging current $I_c$.

A voltage regulator 50 is preferably provided between an input 51 to microcomputer 44 and the junction of first contacts 32A and 32B being connected in parallel in order to provide a regulated voltage $V_R$ as a power supply to microcomputer 44. Voltage regulator 50 is also utilized to terminate charging of battery pack 28 when battery voltage $V_B$ reaches a specified level. Microcomputer 44 will preferably include analog-to-digital converters at each of inputs 43, 45, and 47 to convert signals representing tap voltage $V_T$, voltage $V_B$, and the difference of voltages $V_A$ and $V_B$, respectively.

With respect to battery pack 28, it will be seen in FIGS. 5A–B that it includes a housing 52, a battery 54 positioned within housing 52, and an interface 56 for electrically coupling battery 54 to handheld mobile telephone 10. Interface 56 includes a positive terminal 58 connected to battery 54 at a first end and a negative terminal 60 connected to battery 54 at a second end. The type of battery 54 positioned within housing 52 is distinguished by means of tap voltage $V_T$ provided via identification terminal 62 which is positioned so as to engage identification contact 36.

In order to prevent excess current flow to battery 54 during charging, a fuse 68 may be positioned between battery 54 and negative terminal 60. Additionally, a protection circuit 70 may be positioned between fuse 68 and negative terminal 60 (see lithium type battery pack in FIG. 5B) in order to prevent battery 54B from reaching a temperature and/or a voltage which is too high or too low.

It will be understood that microcomputer 44, contacts 32, 34, and 36, and battery pack 28 are designed to provide a method of identifying different types of batteries 54 housed in battery pack 28. The steps of such method include positioning tap 64 between adjacent cells 66 of each battery 54, connecting an identification terminal 62 to tap 64 so that a tap voltage $V_T$ indicative of a particular battery type is provided thereto, electrically coupling battery 54 to microcomputer 44 by means of positive terminals 58, negative terminal 60, and identification terminal 62, comparing tap voltage $V_T$ to a plurality of specified voltage ranges stored in microcomputer 44, and identifying the particular type of battery 54 from the specified voltage range within which tap voltage $V_T$ lies. The method also may include the step of supplying a charging current $I_c$ to battery 54 in accordance with a charging algorithm in microcomputer 44 applicable to the particular battery type.

Having shown and described the preferred embodiment of the present invention, further adaptations of the apparatus and method for identifying and charging different types of batteries can be accomplished by appropriate modifications by one of ordinary skill in the art without departing from the scope of the invention. For example, the circuitry described herein may be incorporated in handheld mobile telephone 10 or in a battery charger accessory 100 such as the desk charger depicted in FIG. 2.

| PARTS LIST | |
|---|---|
| 10 | handheld mobile telephone (generally) |
| 12 | main housing |
| 14 | front surface of main housing |
| 16 | keypad |
| 18 | display |
| 20 | speaker |
| 24 | rear surface of main housing |
| 26 | cavity of main housing |

-continued

PARTS LIST

| | |
|---|---|
| 28 | battery pack (generally) |
| 30 | interface for coupling to battery pack |
| 32A | first contact (positive-nickel metal hydride type) |
| 32B | second contact (positive-lithium type) |
| 34 | third contact (negative) |
| 36 | fourth contact (identification) |
| 38 | charging circuitry (generally) |
| 40 | current source |
| 41 | AC/DC adapter slot in handheld mobile telephone |
| 42 | switching device |
| 43 | input to microcomputer ($V_T$) |
| 44 | microcomputer |
| 45 | input to microcomputer ($V_B$) |
| 46 | load (resistor) |
| 47 | input to microcomputer ($V_A$–$V_B$) |
| 48 | differential amplifier |
| 49 | output from differential amplifier |
| 50 | voltage regulator |
| 51 | input to microcomputer ($V_R$) |
| 52 | housing of battery pack |
| 54 | battery |
| 56 | interface for coupling to handheld mobile telephone |
| 58 | positive terminal |
| 60 | negative terminal |
| 62 | identification terminal |
| 64 | tap |
| 66 | cells of battery |
| 68 | fuse |
| 70 | protection circuit |
| 100 | battery charger accessory |
| $V_A$ | voltage upstream of load |
| $V_B$ | voltage from battery |
| $V_T$ | tap voltage from identification contact |
| $V_R$ | regulated voltage |
| $I_C$ | charging current |

What is claimed is:

1. A battery pack for a mobile telephone comprising:
(a) a housing;
(b) a battery having a plurality of cells, including at least first and second adjacent cells connected in series, positioned within said housing;
(c) an interface for electrically coupling said battery to said mobile telephone, said interface comprising:
   (1) a positive terminal connected to said battery at a first end; and
   (2) a negative terminal connected to said battery at a second end;
(d) a first electrical path originating at said positive terminal, passing first through said first cell, then through said second cell, and then terminating at said negative terminal, said first electrical path providing means for powering said mobile telephone;
(e) wherein said interface further comprises an identification terminal connecting to said first electrical path at a tap disposed between said first and second cells and supplying a tap voltage; and
(f) wherein a type of battery positioned within said housing is distinguished by a said tap voltage.

2. The mobile telephone of claim 1, wherein said circuitry compares said tap voltage to a plurality of specified voltage ranges stored in said signal processing circuitry and wherein the maximum number of battery types which can be identified by said signal processing circuit is a function of the number of specified voltage ranges.

3. The mobile telephone of claim 1, wherein said charging algorithms control a charging current to said battery.

4. The mobile telephone of claim 1, wherein said circuitry provides a direct charge path between a current source and a terminal of said battery pack.

5. The mobile telephone of claim 3, said circuitry further comprising:
(a) a current source connected to said negative contact and said positive contact; and
(b) a switching device positioned between said current source and said positive contact.

6. The mobile telephone of claim 5, wherein said signal processing circuit controls the opening and closing of said switching device according to said charging algorithms.

7. The mobile telephone of claim 5, said circuitry further comprising a load positioned between said switching device and said positive contact, wherein a first voltage is defined upstream of said load and a second voltage is defined downstream of said load, said charging current being a function of a difference between said first and second voltages.

8. The mobile telephone of claim 3, said circuitry further comprising a voltage regulator positioned between said positive contact and said microcomputer.

9. A method of identifying different types of batteries disposed in battery packs, the method comprising comprising:
providing a first electrical path in each of said different types of battery packs, said first electrical path originating at a positive terminal, passing through a first battery cell, then through a second battery cell, adjacent to said first cell, and terminating at a negative terminal;
providing an identification terminal connected to said first electrical path at a tap disposed between said first and second cells of each battery;
electrically coupling said positive, negative, and identification terminals of said battery to respective positive, negative, and identification contacts connected to a microcomputer;
detecting, at said identification contact, a tap voltage corresponding to said identification terminal; and
identifying a specific battery type by comparing said detected tap voltage to a plurality of predetermined voltage ranges stored in said microcomputer.

10. The mobile telephone of claim 1, further comprising support means in said main housing for receiving battery packs of substantially similar size and shape.

11. The method of claim 9, wherein comparing said detected tap voltage to a plurality of predetermined voltage ranges comprises comparing said detected voltage to at least a first specified voltage range of less than approximately two volts and a second specified voltage range of greater than approximately two volts.

12. The battery pack of claim 1, said tap being located at a distinct position for each type of battery with respect to said plurality of cells comprising said battery.

13. The battery pack of claim 1, wherein said tap is located between the two cells adjacent to said negative terminal.

14. The battery pack of claim 13, wherein the tap voltage provided by said identification terminal of a four cell battery is approximately one-fourth the voltage of said battery.

15. The battery pack of claim 13, wherein the tap voltage provided by said identification terminal of a two cell battery is approximately one-half the voltage of said battery.

16. The battery pack of claim 1, wherein said battery has a total voltage in a range of approximately three to approximately four volts.

17. The battery pack of claim 1, further comprising a fuse positioned between said battery second end and said negative terminal.

18. The battery pack of claim 17, further comprising a protection circuit located between said fuse and said negative terminal to prevent said battery from exceeding a specified temperature and voltage.

19. The battery pack of claim 1, wherein said battery is rechargeable.

20. The battery pack of claim 19, wherein said battery is among a group including nickel cadmium, nickel metal hydride, and lithium.

21. The battery pack of claim 1, wherein said positive terminal is uniquely positioned with respect to said housing for each particular type of said battery therein.

22. A mobile telephone, comprising:

(a) a main housing;

(b) a signal processing circuit located within said main housing for operating said mobile telephone in a particular mode of communication, said signal processing circuit connected to positive, negative, and identification contacts;

(c) a battery pack comprising positive, negative, and identification terminals attached to said main housing for powering said mobile telephone, said battery pack comprising a first electrical path originating at said positive terminal, passing through a first battery cell, then through a second battery cell, and terminating at said negative terminal, (d) wherein said identification terminal of said battery pack connects to said first electrical path at a tap disposed between said first and second battery cells, said identification terminal supplying a tap voltage;

(e) an interface for electrically coupling said positive, negative, and identification contacts to said respective positive, negative, and identification terminals, battery wherein said identification contact receives said tap voltage from said identification terminal; and (f) circuitry associated with said signal processing circuit for identifying the particular type of battery in said battery pack from said received tap voltage.

23. The mobile telephone of claim 22, further comprising circuitry associated with said signal processing circuit for charging said battery pack in accordance with a particular charging algorithm applicable to the electrical characteristics of said battery pack.

24. The method of claim 1, further comprising the step of supplying a charging current to said battery in accordance with a charging algorithm in said microcomputer applicable to said particular battery type.

25. The mobile telephone of claim 22, wherein said battery pack further comprises a second electrical path originating at said positive terminal, passing through said first cell, and terminating at said identification terminal via said tap, said second electrical path not including said second cell.

26. The battery pack of claim 1, wherein said battery pack comprises a second electrical path originating at said positive terminal, passing through said first cell, and terminating at said identification terminal via said tap, said second electrical path not including said second cell.

* * * * *